United States Patent [19]

Sims, Jr.

[11] 4,288,406
[45] Sep. 8, 1981

[54] PROCESS ENERGY RECOVERY

[75] Inventor: J. Robert Sims, Jr., Baton Rouge, La.

[73] Assignee: Exxon Research & Engineering Co., Florham Park, N.J.

[21] Appl. No.: 70,566

[22] Filed: Aug. 29, 1979

[51] Int. Cl.³ .......................... F01K 25/08; B01J 3/00
[52] U.S. Cl. ..................................... 422/131; 60/648; 60/649; 91/267; 91/273; 91/341 R; 422/187
[58] Field of Search ................................ 422/131–138, 422/187, 112; 60/648, 649; 91/341 R, 267, 273, 268, 224

[56] References Cited

U.S. PATENT DOCUMENTS

| | | | |
|---|---|---|---|
| 2,850,361 | 9/1958 | Austin, Jr. | 422/187 |
| 3,649,208 | 3/1972 | Hornschuch | 422/134 |
| 3,905,197 | 9/1975 | Miller | 60/649 |
| 4,016,724 | 4/1977 | Karlsson | 60/649 |
| 4,045,960 | 9/1977 | Cornelius et al. | 60/648 |

Primary Examiner—Michael S. Marcus
Attorney, Agent, or Firm—M. B. Kurtzman

[57] ABSTRACT

A system for recovering energy from a pressured reactor comprising a reactor, a reciprocating engine connected to the reactor to receive reaction effluent from said reactor thereby driving the pistons of the reciprocating engine by expansion of the effluent and recovery apparatus downstream of the engine for recovering products from the effluent.

The expanding reactor effluent is used to drive the pistons which are especially valved in conjunction with the effluent inlet port in the cylinder to facilitate handling the effluents, the pistons in turn operate a crankshaft through a crosshead which may power compressors or operate a generator to produce electricity. It is reasonable to expect recovery in a directly usable form, such as electricity, of over 25% of the energy theoretically available in the pressured reactor effluent in some cases.

6 Claims, 6 Drawing Figures

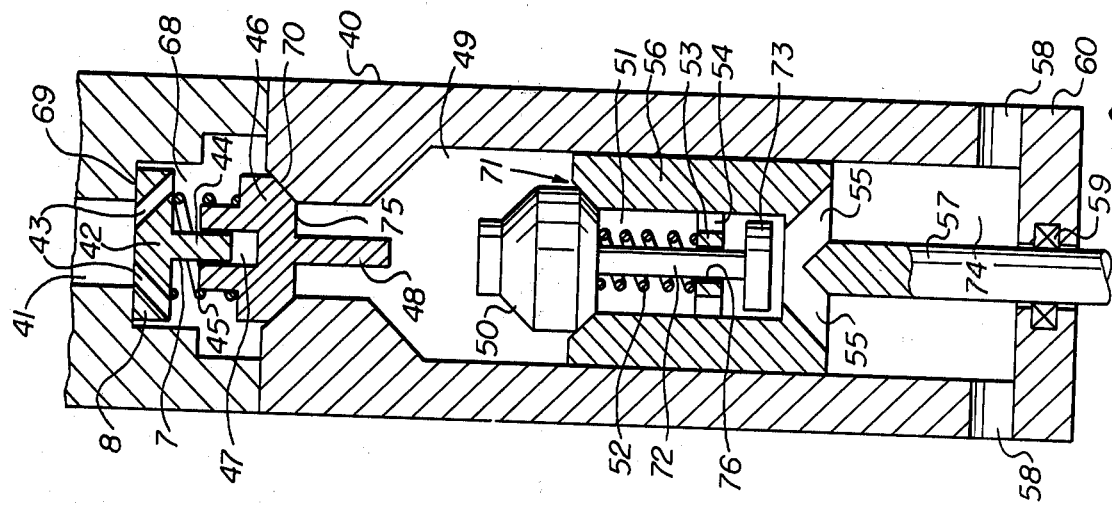
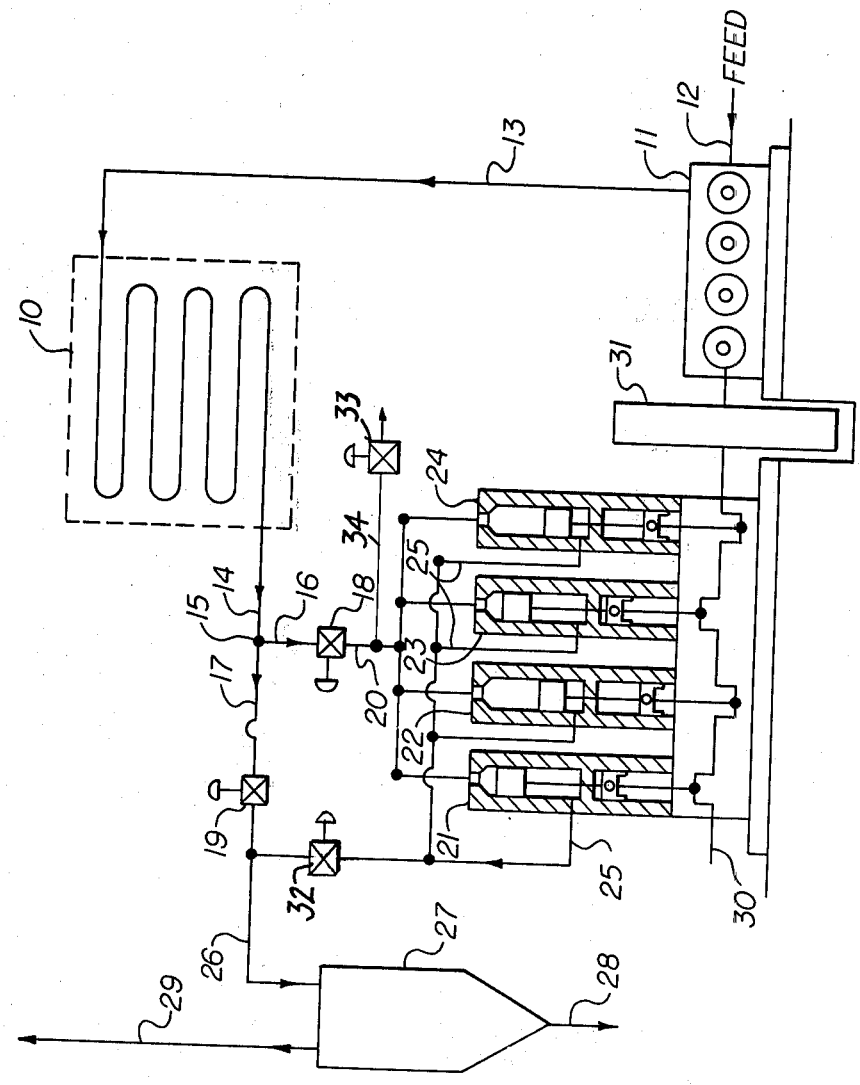
fig.1
fig.2

PROCESS ENERGY RECOVERY

BACKGROUND OF THE INVENTION

1. Field of the Invention

The present invention relates to the method and apparatus for recovering energy during the pressure letdown of high pressure reactor effluent.

2. Prior Art

Many chemical reactions are conducted under conditions of high pressure. At some point in the process, this pressure is relieved or dissipated so that the product, unreacted components, etc., can be recovered. Not infrequently, considerable energy has been put into pressuring the system and reactants. The conventional manner of operating such systems has been merely to lose the energy represented by the effluent pressure by reducing the pressure across a valve.

Most of the prior effort to recover this "process energy" has been concentrated on the design of a turbine through which the reaction effluents would be passed, as shown, for example, in U.S. Pat. Nos. 2,850,361 and 3,649,208. Such an approach may work in a single phase reaction system, however, in a multiphase system, particularly those wherein the pressure reduction is employed to cause phase separation, a turbine is generally unsatisfactory. Many difficulties exist in design of such a turbine, because as the pressure is reduced, a liquid or solid phase separates from the gas and tends to coat turbine blades and plug passages. Turbine construction is such that imbalancing of the blades by random deposition of material thereon can cause failure of the engine.

In the more specific case of a system for recovery of process energy from the high pressure, low density polyethylene process, care must be taken that the polyethylene is not trapped in a dead spot, e.g., on a turbine blade, for a sufficient length of time to cross link or form degradation products which may then find their way to the product with the result being lost in product consistency and quality.

It is a feature of the present invention that a substantial portion of the process effluent energy is recovered. It is an advantage of the present system that the energy recovery apparatus is not as likely to become inoperative due to fouling as the prior art turbine systems.

It is a further feature of the present invention that energy is recovered by isentropic expansion of the reactor (reaction) effluent as opposed to the isenthalpic and irreversible expansion of the reactor effluent across a valve.

SUMMARY OF THE INVENTION

Briefly stated, one aspect of the present invention is a system for recovering energy from pressured reaction effluent comprising a reactor for carrying out chemical reactions under pressure, product recovery apparatus and a reciprocating engine located downstream of said reactor, intermediate said reactor and said product recovery apparatus, whereby reaction effluent from said reactor passes into said reciprocating engine to operate said engine and produce energy therefrom. A reciprocating engine is generally a less delicate device than a turbine and is not incapacitated by some degree of fouling. Fouling is not anticipated to be a serious problem for the present engine apparatus.

In particular, the system and the process and apparatus to be described hereafter, are suited for the separation of multiphase effluent systems, wherein the pressure reduction is a means for separation of the phases, for example, the high pressure reaction of ethylene to produce low density polyethylene wherein a substantial portion of the ethylene is unreacted and is separated by depressuring the system whereby the polymer separates as a liquid phase and the unreacted ethylene gas is recycled to the compressors. In a typical reactor, the pressure may be reduced from about 2800 kg/cm$^2$ to about 300 kg/cm$^2$.

Another aspect of the present invention is the process of recovering energy from a pressured reactor effluent comprising passing a pressured fluid from a reactor into a reciprocating engine having a plurality of cylinders (at least two) and pistons operable therein, operating said pistons by expansion of said fluid into said cylinders sequentially to operate a crankshaft attached to said pistons, and recovering said expanded fluid from each cylinder. (The crankshaft may be indirectly attached to the piston through a crosshead as discussed below). Generally the pressure present in the reactor effluent is that necessary to operate the reciprocating engine and produce a positive energy output. However, other considerations of the system, such as temperature or pressure requirements of recovery equipment downstream of the reciprocating engine, are to be considered in the desirability of the system and in the degree of energy recovery. These requirements of course, will vary for each effluent system and the degree of energy recovery in relation thereto may be determined by the routineer in the art.

The effluent from the reciprocating engine will, in those systems wherein useful products are produced, be subjected to further treatment generally of the type to obtain the recovery and/or separation of product, unreacted reagents, by-products and the like.

Another aspect of the present invention is the reciprocating engine which is used to recover the energy in the form of pressure from the reaction system. Basically, the engine is comprised of two or more cylinders, each of which having a piston or plunger slidably mounted therein and connected to a crankshaft either directly or indirectly.

Briefly, the reciprocating engine comprises at least two cylinders, each of said cylinders having an inlet and outlet port, said outlet being distal to said inlet port, means for opening and closing said inlet port, a piston movably mounted in each cylinder, each piston having a conduit therethrough, means for opening and closing said conduit and a drive rod operably associating each of said pistons to a crankshaft. Each piston is fitted with a valve which is biased open, thereby providing egress therethrough to the outlet in the cylinder. Opposed to each of the valves in each piston seated in the inlet is an inlet valve, which is biased toward the piston and which closes the cylinder. The cylinder is connected to the reactor through the inlet valve. As the piston makes its upward stroke toward the inlet valve in the cylinder, a portion of the piston valve contacts a portion of the inlet valve. The piston valve is forced closed and the inlet valve is then forced open. Effluent fluids then enter the cylinder in an expansion chamber forcing the piston downward, i.e., away from the inlet valve, and disengaging the contact of the two valves which allows the inlet valve to close. The piston valve opens when the pressure in the expansion chamber between the piston and the inlet valve is equal to the pressure adjacent to the outlets, thereby allowing the fluid to exit the expansion chamber as the piston repeats the cycle.

Each of the pistons is sequenced to provide the conventional reciprocating action.

In carrying out the present invention, in some embodiments only a portion of the reactor effluent will be passed to the reciprocating engine for recovery of the process energy. In the case of high pressure, low density polyethylene some portion of the reactor effluent is by-passed to the recovery apparatus to maintain the reactor pressure. However, other means than the use of reactor effluent may be employed to obtain this control and in any event the present invention contemplates passing all or a portion of a reactor effluent through the reciprocating engine for recovery of the energy therefrom.

In the high pressure low, density polyethylene reaction system, generally from 50 to 100% and more preferably 75 to 85% of the reactor effluent will be passed through the reciprocating engine for recovery of energy.

For example, the theoretical energy available from the isentropic expansion of 1 kg of pure ethylene from a pressure of 2,800 kg/cm$^2$ and a temperature of 248° C. to a pressure of 300 kg/cm$^2$ is about 134 kcal. The outlet temperature of the gas would be about 118° C. Typically the reactor effluent consists of approximately 70% unreacted ethylene and 30% polyethylene. The theoretical energy available from the isentropic expansion of this mixture is about 80% of that of pure ethylene, or about 107 kcal per kg of effluent.

Furthermore, part of the reactor effluent will be by-passed around the energy recovery engine for reactor pressure control and bump cycle, which for this example is a 20% by-pass of reactor throughput.

The pressure drop from the engine discharge to the high pressure separator will be a practical limitation in the system for the engine ΔP. For this illustration, a minimum engine discharge pressure of 470 kg/cm$^2$ has been assumed.

The mechanical efficiency of the engine is 80% and the efficiency of the generator which it drives is 95%.

In one specific example, a recovery engine with 4 cylinders, each having a diameter of 92 mm and a stroke length of 433.5 mm is used. The engine operates at a speed of 180 revolutions per minute. The clearance volume, or the volume enclosed by the cylinder and piston at the moment when the inlet valve closes, is twice the displacement of the piston. If it is assumed that there are no losses incurred in filling the clearance volume with reactor effluent during the time when the inlet valve is open, then the calculation of the energy released from the reactor effluent to the piston during the travel of the piston to the bottom dead center position can be calculated. The energy required to force the reactor effluent out of the cylinder as the piston moves back toward the top dead center position must then be subtracted to obtain the net power produced. This results in a theoretical power production of 45 kcal/kg of pure ethylene throughput.

Using a correction factor of 80% for the presence of polymer, 80% mechanical efficiency and 95% electrical efficiency, the net power output of the engine is about 27 kcal/kg of reactor effluent or about 25% of the theoretical energy available in the gas polymer mixture. The theoretical isentropic efficiency of the cycle is about 37%.

The flow rate of reactor effluent through this engine is about 43,000 kg/hr. The total flowrate in the reactor is about 52,000 kg/hr. The engine produces about 1,400 kw of power, which represents about 16% of the 8,800 kw power input to the recirculating gas compressor used in this process.

In the current process, there is no energy recovery.

Operating the present invention will generally require a reactor effluent having a pressure of about 1500 kg/cm$^2$ to about 4000 kg/cm$^2$ and more preferably from about 2000 to 3000 kg/cm$^2$. In operating the invention the effluent pressure may vary, however, it is expected that the variation for a properly conducted and controlled reaction will not be great, i.e., only about ±5%. Further, it is clear that variation in the reactor effluent pressure may necessitate adjustment of the energy recovery system.

In the specific example of polyethylene manufacture, the effluent pressure may vary according to the different grades of polyethylene being produced; however, for a single grade it may be contemplated that such variations will be small, i.e., only about ±5%, except during the bump cycle. The bump cycle is a repetitive sharp pressure decrease, designed to reduce fouling of the reactor by polymer product.

BRIEF DESCRIPTION OF THE DRAWINGS

FIG. 1 is a schematic representation of a process energy recovery system.

FIG. 2 is a cross sectional elevation of one cylinder of the reciprocating engine.

DETAILED DESCRIPTION OF THE INVENTION

Figure 6:
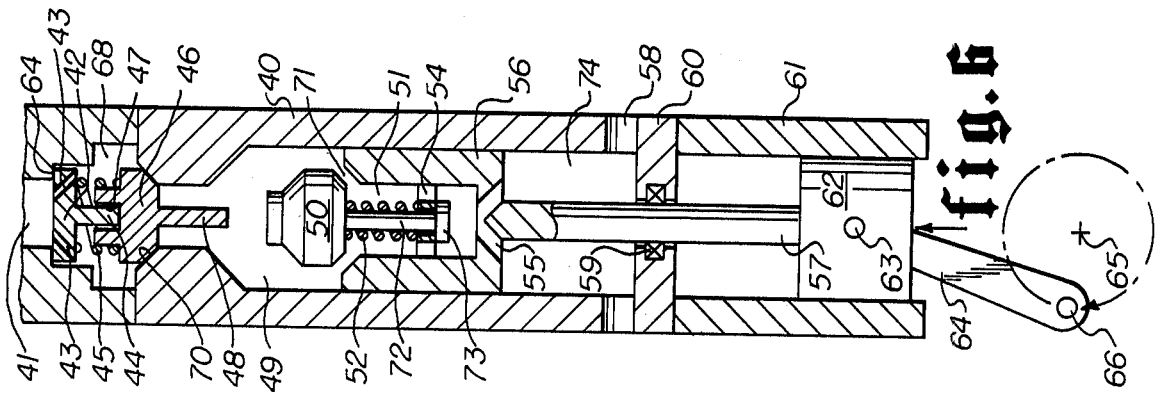
FIGS. 3–6 are a sequential illustration in cross section of the operation of one cylinder of the present reciprocating energy recovery engine through a full cycle.

FIG. 1 shows one embodiment employing the reciprocating engine apparatus of the present invention, which is a high pressure low density polyethylene manufacturing and recovery facility. An ethylene feed 12 enters compressor 11 where it is pressurized and then passed into tubular reactor 10 via line 13. The effluent leaving reactor 10 via line 14 generally has a pressure in the range of 2000 to 3000 kg/cm$^2$.

Under prior procedures, the effluent from reactor 10 would have proceeded through valve 19, where its pressure would be reduced to about 300 kg/cm$^2$ directly into high pressure separator 27. However, according to the present invention line 14 contains a tee 15 by which means all or a portion (usually a portion) of the reactor effluent may be passed through line 16 and valve 18 into line 20 which is connected to a plurality (four) of cylinders (each comprising an expansion chamber and an exhaust chamber) 21, 22, 23 and 24 respectively, wherein the effluent from the reactor 10 is sequentially expanded to operate pistons in the cylinders ultimately driving a crankshaft (which will be described in detail in regard to FIGS. 3–6). In this particular embodiment, the crankshaft is connected to a synchronous motor 31 and back into the compressor 11. Alternatively the crankshaft may be connected to a fly-wheel and to other equipment (not shown) such as an electric generator.

The expanded gases from the reactor leave the cylinders via lines 25, pass through valve 32, and are combined with the reaction effluent which has by-passed the reciprocating engine via lines 17 and passed through valve 19, into line 26 through which the effluent gases from the reactor from all sources are fed into the high pressure separator 27. Liquid polymer is removed via line 28 which carries the liquid polymer to the low pressure separator (not shown) for further separation and purification. The unreacted ethylene is taken off via 29, and may be recycled to the reaction via line 12.

Valves 18 and 32 may be closed and valve 33 opened to allow maintenance of the energy recovery engine. Valve 19 is positioned by an automatic controller to maintain a predetermined pressure in the reactor.

Turning now to FIG. 2, which is an enlarged detail of one cylinder of the reciprocating engine, the entry of effluent gas, for example, through line 20 of FIG. 1 is accomplished via inlet 41. Located in the inlet 41, is valve 46 which is seated against an annular frusto conical or beveled surface 70 thereby sealing the inlet from the expansion chamber 49. The inlet valve 46 is biased in place, thereby closing the inlet port 75, by a helical compression spring 45, which is biased against retainer 42, comprising a disk 8 and a leg 7. The disk 8 of the retainer 42 is biased by the spring against annular shoulder 69 in the engine block 40. The leg 7 of the retainer 42 extends downward into a channel 47 of inlet valve 46 thereby serving as a guide for valve 46. Conduits 43 are provided through the retainer 42 such that the chamber 68 adjacent to the inlet port 75 is always in contact with the effluent stream from the reactor.

Extending downward into the expansion chamber 49 from inlet valve 46 is a rod 48 which is adapted to contact a portion of piston valve 50. The operation and relationship of these two valves will be described in detail in regard to FIGS. 3-6. The piston valve 50 is normally biased by helical compression spring 52 out of conduit 51 which passes through piston 56, however FIG. 2 corresponds to the operational configuration shown in FIG. 4 and in such configuration, the piston valve 50 is seated into the opening 71, closing conduit 51, which indicated there is a pressure within the expansion chamber 49 greater than that in the exhaust chamber 74. The compression spring 52 biases against the ring 53, which is fixedly mounted in conduit 51, and the lower surface of valve 50 tending to force the valve 50 out of conduit 51. Ports 54 are provided in ring 53 so that the conduit 51 is continuous through the piston 56 and exits 55. The valve 50 is connected to rod 72 which extends through ring 54 and terminates in a head 73 which is larger than the opening 76 through ring 54, serving to restrain the extent of displacement of valve 50 out of opening 71 by spring 52. The piston 56 is connected to a rod 57 which extends through the bottom member 60 out of the cylinder through high pressure seal 59. Outlet ports 58 are provided from exhaust chamber 74, which for example, would then connect to line 25 as shown in FIG. 1.

Figure 3:
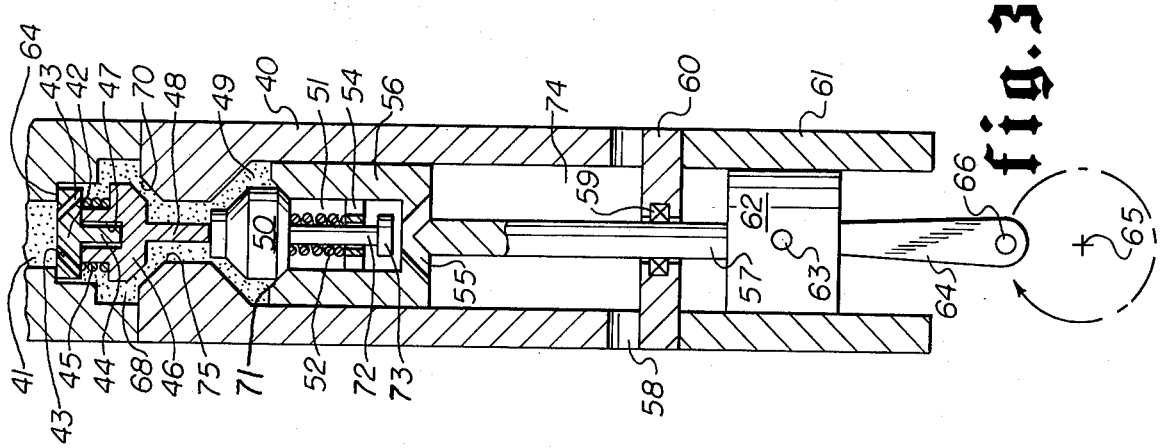

In FIGS. 3-6, a single cylinder is taken through the cycle of operation which will aid in understanding the operation of the apparatus and the relationship of the components of the engine. In FIG. 3, the piston 56 is at the top of its stroke in the cylinder. The piston valve 50 has contacted rod 48, forcing piston valve 50 to seat on the opening 71 of conduit 51 in the piston 56. As the piston 56 continues to travel upward, the contact between piston valve 50 and rod 48 which closed the piston valve 50 raises the inlet valve 46 off the beveled surface 70, thereby fluidly connecting expansion chamber 49 with the inlet 41 through port 75, allowing reactor effluent to enter the expansion chamber 49.

The effluent expands into expansion chamber 49, driving the piston 56 down. The pressure in expansion chamber 49 holds piston valve 50 closed. As the piston 56 travels down, inlet valve 46 is forced by spring 45 against the beveled surface 70, isolating the expansion chamber 49 from chamber 68. As the effluent continues to expand, the pressure difference between chambers 68 and 49 will increase, holding inlet valve 46 closed in conjunction with spring 45. Preferably piston valve 50 is seated in conduit 51 before inlet valve 46 is forced open, thereby making full use of the expanding reactor effluent. This sequence may be obtained by the selection of springs 45 and 52 of appropriate resilience.

Figure 4:
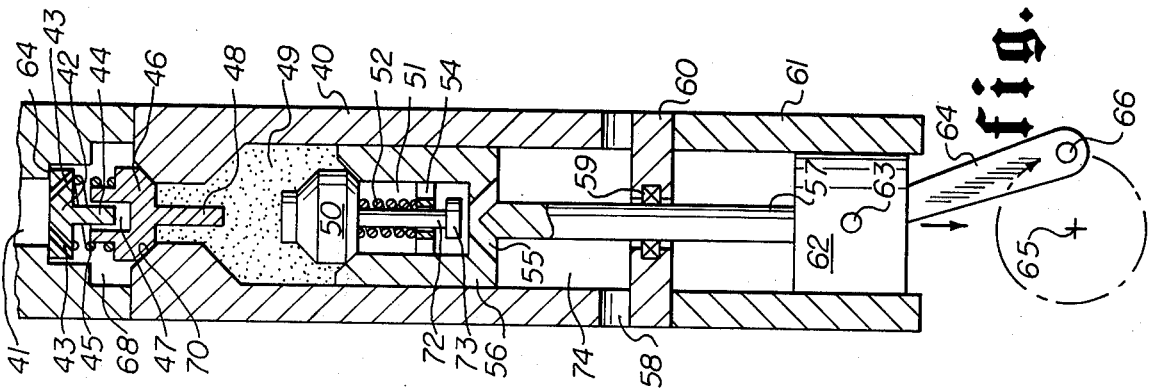

In FIG. 4, the piston 56 is shown at the middle point of its downward stroke, driving the rod 57 downward. Rod 57 is attached to crosshead 62 which rides within the cylindrical guide 61. The crosshead is attached pivotally at 63 to an arm 64 which is in turn pivotally attached in the conventional manner to a crankshaft.

Figure 5:
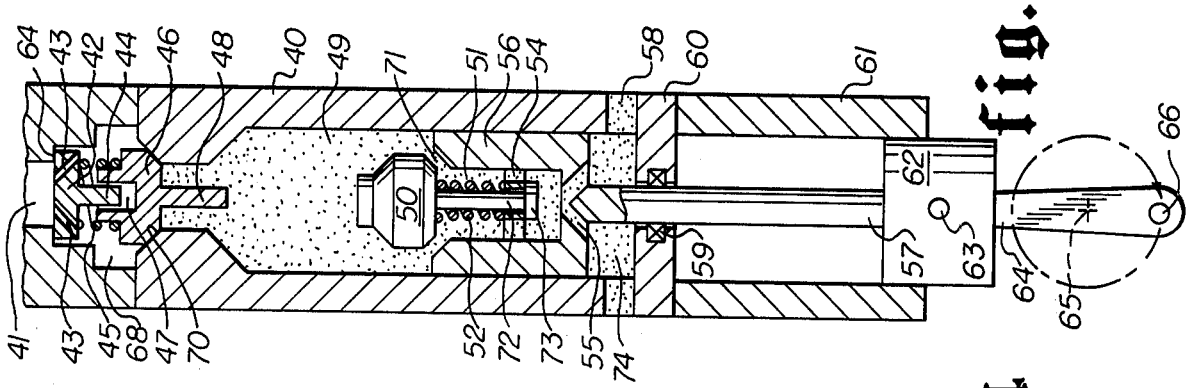

In FIG. 5, the piston 56 has reached the bottom of its stroke. The piston valve 50 opened during the downward stroke when the pressure within the expansion chamber 49 became equal with the pressure in the exhaust chamber 74 thereby allowing the effluent to escape through the exhaust chamber 74 and outlet ports 58. The upward movement of the piston valve out of opening 71 is limited by head 73 attached to rod 72.

In FIG. 6 the piston 56 is shown at a point halfway on its upward stroke. As the piston moves upward, the piston valve 50 is maintained by spring 52 out of the opening 71 such that the chamber 49 is fluidly connected through the piston via conduit 51 into the exhaust chamber 74 and the outlet ports 58 thereby forcing the gases which remain in the expansion chamber 49 out of the cylinder.

The cycle will be repeated as the piston rises to the top of its stroke as shown in FIG. 3, thereby having caused one complete rotation of the crankshaft about its axis 65.

The invention claimed is:

1. A system for polymerizing ethylene and recovering energy from pressured reactor effluent comprising compressor means for compressing ethylene, reactor means for carrying out ethylene polymerization reactions under pressure and adapted to receive compressed ethylene from said compressor means, product recovery apparatus for separating reactor product effluent comprising polyethylene and unreacted ethylene, and a reciprocating engine comprising at least two cylinders, an inlet port and an outlet port in each cylinder, a first valve movably seated in each of said inlet ports, means biasing said first valve into said inlet port, a piston slidably movable in each cylinder, each of said pistons having a conduit therethrough and a second valve movably mounted in each of said conduits, toward said first valve and aligned to contacts at first valve, each of said second valves being biased out of said conduits, whereby contact of said first valve and said second valve forces said second valve into said conduit and forces said first valve out of said inlet port, said reciprocating engine adapted to receive reactor effluent under pressure and being operatively responsive to the expansion of reaction effluent therein.

2. The system according to claim 1 wherein said reciprocating engine is operably connected to the compressor means.

3. The system according to claim 1 further including by-passing means for conducting all or a portion of the reaction effluent by said reciprocating engine and into the product recovery apparatus.

4. The system according to claim 3 wherein the by-passing means includes valve means for maintaining a predetermined pressure in the reactor and controlling the percentage of reaction effluent by-passing the reciprocating engine.

5. The system according to claim 4 wherein the valve means is adapted to allow from about 50 to 100% of the reaction effluent to pass into said reciprocating engine.

6. The system according to claim 5 wherein the valve means is adapted to allow from about 75 to 85% of the reaction effluent to pass into said reciprocating engine.

* * * * *